United States Patent
Bao et al.

(10) Patent No.: US 10,752,799 B2
(45) Date of Patent: Aug. 25, 2020

(54) SELF-CURING COATING COMPOSITIONS

(71) Applicant: PPG Industries Ohio, Inc., Cleveland, OH (US)

(72) Inventors: Hanzhen Bao, Mason, OH (US); Youssef Moussa, Loveland, OH (US); Katlyn Michelle Fix, Amelia, OH (US)

(73) Assignee: PPG Industries Ohio, Inc., Cleveland, OH (US)

( * ) Notice: Subject to any disclaimer, the term of this patent is extended or adjusted under 35 U.S.C. 154(b) by 72 days.

(21) Appl. No.: 15/891,061

(22) Filed: Feb. 7, 2018

(65) Prior Publication Data
US 2019/0241761 A1   Aug. 8, 2019

(51) Int. Cl.
| | | |
|---|---|---|
| *C09D 133/02* | (2006.01) | |
| *C09D 133/08* | (2006.01) | |
| *B65D 25/14* | (2006.01) | |
| *C09D 133/10* | (2006.01) | |
| *C09D 5/02* | (2006.01) | |
| *C09D 4/06* | (2006.01) | |
| *C08F 220/10* | (2006.01) | |
| *C09D 4/00* | (2006.01) | |

(52) U.S. Cl.
CPC ........... *C09D 133/02* (2013.01); *B65D 25/14* (2013.01); *C08F 220/10* (2013.01); *C09D 4/00* (2013.01); *C09D 4/06* (2013.01); *C09D 5/02* (2013.01); *C09D 133/08* (2013.01); *C09D 133/10* (2013.01)

(58) Field of Classification Search
CPC .. C09D 133/02; C09D 133/08; C09D 133/10; C09D 5/02; C09D 4/00; C09D 4/06; B65D 25/14; C08F 220/10
USPC ......................................................... 524/556
See application file for complete search history.

(56) References Cited

U.S. PATENT DOCUMENTS

| | | | |
|---|---|---|---|
| 4,009,138 A | 2/1977 | Kobashi et al. | |
| 4,092,287 A | 5/1978 | Ito et al. | |
| 4,436,875 A | 3/1984 | Janiga | |
| 5,714,539 A | 2/1998 | Perez et al. | |
| 7,592,047 B2 | 9/2009 | O'Brien et al. | |
| 2003/0224189 A1* | 12/2003 | McBain | C08F 283/006 428/475.8 |
| 2006/0047062 A1* | 3/2006 | Hsu | C08F 220/18 524/556 |
| 2015/0218407 A1* | 8/2015 | Bao | C09D 125/14 428/36.91 |
| 2016/0017171 A1* | 1/2016 | Li | C08F 220/00 428/35.7 |

* cited by examiner

Primary Examiner — Michael Bernshteyn
(74) Attorney, Agent, or Firm — Diane R. Meyers

(57) ABSTRACT

A self-curing coating composition comprising a polymer containing hydroxyl groups, carboxylic acid groups and acid groups comprising sulfonic acid groups and/or phosphoric acid groups is disclosed. Methods for applying the coating to a substrate and packages coated with the compositions are also disclosed.

20 Claims, No Drawings

SELF-CURING COATING COMPOSITIONS

FIELD OF THE INVENTION

The present invention relates to a self-curing coating composition comprising a polymer containing hydroxyl groups, carboxylic acid groups and sulfonic and/or phosphoric acid groups.

BACKGROUND OF THE INVENTION

A wide variety of coatings have been used to coat the surfaces of food and beverage packages. For example, metal cans are sometimes coated using coil coating or sheet coating operations; that is, a plane or coil or sheet of a suitable substrate, for example, steel or aluminum is coated with a suitable composition and cured. The coated substrate is then formed into the can body or can end. Alternatively, the coating composition may be applied, for example, by spraying, dipping and roll coating, to the formed can and then cured. Coatings for food and beverage packages may be capable of high speed application to the substrate and provide the necessary properties when cured to perform in a demanding end use. For example, the coating should be safe for food contact and have acceptable adhesion to the substrate.

Coatings for food and beverage packages may contain external curing agents that are reactive with hydroxyl and/or carboxylic acid groups in the resinous binder. The curing agent can be a phenol-formaldehyde or an amine such as melamine, benzoguanamine or urea-formaldehyde condensate. Such curing agents, however, may be made with and/or release formaldehyde during the curing or crosslinking reaction. Minimizing if not eliminating formaldehyde is desired.

SUMMARY OF THE INVENTION

The present invention provides a self-curing coating composition comprising a polymeric binder containing hydroxyl groups, carboxylic acid groups, and acid groups comprising sulfonic acid groups and/or phosphoric acid groups.

The present invention also provides a self-curing coating composition comprising an emulsion polymerized latex reaction product of
(a) an ethylenically unsaturated monomer component in the presence of
(b) an aqueous dispersion of an at least partially neutralized polymer containing hydroxyl groups, carboxylic acid groups and acid groups comprising sulfonic acid groups and/or phosphoric acid groups.

The invention also provides a method of coating a package or a portion thereof comprising:
(a) applying any of the coating compositions as described above to at least a portion of the package before and/or after forming the package, and
(b) curing the coating.

The invention also provides a package comprising:
any of the coating compositions as described above deposited on at least a portion of the package.

DETAILED DESCRIPTION

The term "dispersed in aqueous medium" means that a polymer can be mixed into aqueous medium to form a stable mixture; that is, the mixture does not separate into immiscible layers within an hour after mixing when left to stand at room temperature (23° C.).

The term "aqueous medium" means water or a mixture of water and organic solvent.

The term "latex" means a polymer that is polymerized by free radical initiated emulsion polymerization techniques in aqueous medium. The polymer is in particulate form and dispersed in aqueous medium.

The term "food-contacting surface" refers to the surface of a package such as an inner surface of a food or beverage package that is in contact with, or intended for contact with, a food or beverage product. By way of example, an interior surface of a metal substrate of a food or beverage package, or a portion thereof such as a can end or a can body, is a food-contacting surface even if the interior metal surface is coated with a coating composition.

The term "food" includes solids such as vegetables and beverages such as beer and soft drinks.

The term "self-curing coating composition" means a coating composition that contains a polymeric binder that cures such as by thermal curing in the absence of a separately added curing agent. For example, a curing agent that is made with a formaldehyde product and/or generates formaldehyde on curing may be omitted from the present coatings.

The terms "crosslinker" or "curing agent" refer to a molecule capable of forming a covalent linkage between two or more moieties, e.g. two moieties being present in two different polymeric molecules or between two different regions of the same polymer.

The term "cure" means the coating can withstand at least 5 methyl ethyl ketone (MEK) double rubs before removal of the coating from the substrate.

The term "glass transition temperature" ("Tg") for vinyl and (meth)acrylic polymers is a theoretical value being the glass transition temperature as calculated by the method of Fox on the basis of monomer composition of the monomer charge according to T. G. Fox, Bull. Am. Phys. Soc. (Ser. II) 1, 123 (1956) and J. Brandrup, E. H. Immergut, Polymer Handbook 3rd edition, John Wiley, New York, 1989.

The term "on", when used in the context of a coating applied on a surface or substrate, includes both coatings applied directly or indirectly to the surface or substrate. Thus, for example, a coating applied to a primer layer overlying a substrate constitutes a coating applied on the substrate.

Unless otherwise indicated, the term "polymer" includes both homopolymers and copolymers (e.g., polymers of two or more different monomers) and oligomers. Resin is used interchangeably with polymer.

Acrylic and methacrylic monomers and polymers are designated as (meth)acrylic monomers and polymers.

Molecular weights are on a number average or weight average basis as indicated and are determined by gel permeation chromatography using polystyrene standards.

As used herein, unless otherwise expressly specified, all numbers such as those expressing values, ranges, amounts or percentages may be read as if prefaced by the word "about", even if the term does not expressly appear. Also, any numerical range recited herein is intended to include all sub-ranges subsumed therein. Singular encompasses plural and vice versa. As used herein, "a", "an", "the", "at least one" and "one or more" may be used interchangeably. Thus, for example, a coating composition that comprises "a" polymer, "a" sulfonic acid group-containing ethylenically unsaturated monomer, "a" phosphoric acid group-containing ethylenically unsaturated monomer, "a" carboxylic acid group-containing ethylenically unsaturated monomer, "a" hydroxyl group-containing ethylenically unsaturated monomer, "an" ethylenically unsaturated monomer component and the like can be interpreted to mean that the coating composition includes "one or more" of any of these items.

Also herein, the recitations of numerical ranges by endpoints include all numbers subsumed within that range (e.g., 1 to 5 includes 1, 1.5, 2, 2.75, 3, 3.80, 4, 5, etc.). Furthermore, disclosure of a range includes disclosure of all subranges included within the broader range (e.g., 1 to 5 discloses 1 to 4, 1.5 to 4.5, 4 to 5, etc.).

The expressions "core" and "shell" are used herein based on the theory that in forming the latex particles, the first stage of polymerization results in the formation of a polymeric surfactant, also called a soap, which becomes located in an outer or shell region of the final particle, and the second stage polymerization results in the formation of a core on the inside of the shell. For the purposes of this description, the polymer portion termed the "shell" is intended to indicate that which is polymerized first.

The present invention is directed to a self-curing coating composition comprising a polymer containing hydroxyl groups, carboxylic acid groups and acid groups comprising sulfonic acid groups and/or phosphoric acid groups. The self-curing aqueous coating composition of the invention is typically a composition that comprises an emulsion polymerized latex polymer as the film-forming binder of the composition. Accordingly, the present invention is further directed to a self-curing coating composition comprising an emulsion polymerized latex reaction product of (a) an ethylenically unsaturated monomer component in the presence of (b) an aqueous dispersion of an at least partially neutralized polymer containing hydroxyl groups, carboxylic acid groups and acid groups comprising sulfonic acid groups and/or phosphoric acid groups. The present invention is described herein in terms of a coating comprising a latex, but the invention is not so limited and any polymer comprising hydroxyl groups, carboxylic acid groups and sulfonic and/or phosphoric acid groups is within the scope of the present invention. Such polymers can be prepared by any means known in the art. Such polymers can be solution polymers, graft polymers and the like.

The monomer components used in the formation of the polymer, such as in the first stage polymerization to produce the polymeric surfactant or soap that will form the shell of the latex particles, can be ethylenically unsaturated monomers selected to yield a polymer having hydroxyl groups, carboxylic acid groups and acid groups comprising sulfonic acid groups and/or phosphoric acid groups. The ethylenically unsaturated monomers having hydroxyl groups are typically a hydroxy functional (meth)acrylate such as hydroxyethyl (meth)acrylate, hydroxypropyl (meth)acrylate, 2-hydroxybutyl (meth)acrylate and 4-hydroxybutyl (meth)acrylate. The hydroxy group-containing monomer can be used in any suitable amount based upon the needs of the user, and in the case of latex formation can be present in the first stage monomer mixture in amounts of at least 5, such as at least 20, such as, at least 30, such as 5 to 50, such as 20 to 50 percent by weight, based on weight of monomers used in the first stage polymerization The ethylenically unsaturated monomers containing carboxylic acid groups can be (meth)acrylic acids such as acrylic acid and methacrylic acid. The carboxylic acid functional monomers are reactive with the hydroxyl functional monomers to form the self-curing reaction and, when at least partially neutralized with base, they help to disperse the polymeric soap in aqueous medium and stabilize the latex particles in the aqueous medium. The carboxylic acid functional ethylenically unsaturated monomers can be used in any suitable amount based upon the needs of the user, and in the case of latex formation can be present in the first stage monomer mixture in amounts of at least 5, such as greater than 12, such as 5 to 30, such as greater than 12 to 30 percent by weight, based on weight of monomers used in the first stage polymerization. The molar ratio of carboxylic acid groups to hydroxyl groups may be from 0.5 to 1.5:1.

In addition to the hydroxyl and the carboxylic acid group-containing ethylenically unsaturated monomers, ethylenically unsaturated monomers comprising sulfonic acid group-containing monomers and/or phosphoric acid group-containing ethylenically unsaturated monomers are used. Examples of such monomers include 2-sulfoethyl (meth) acrylate, 1-acrylamide-1-propane sulfonic acid, 2-acrylamide-2-methylpropane sulfonic acid vinyl sulfonic acid and monomers of the structure:

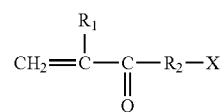

where $R_1$ represents hydrogen or methyl; $R_2$ represents an oxyalkylene group and X represents a phosphoric acid group.

Specifically, $R_2$ can have the following structure:

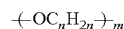

where n is an integer of 2 to 4, and m is 1 to 40, such as n=2 and m=1 to 8.

X can have the following structure:

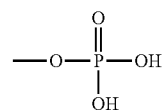

Examples of such monomers are hydroxyethyl methacrylate phosphate and those monomers commercially available from Rhodia as SIPOMER PAM-100, SIPOMER PAM-200 and SIPOMER PAM-300. For PAM-100, $R_1$=methyl, n=2 and m=7.

These acid group-containing ethylenically unsaturated monomers may catalyze the reaction of the hydroxyl functional and carboxylic acid functional monomers and possibly an esterification reaction between the hydroxyl functionality and the ester functionality such as that associated with alkyl (meth)acrylates mentioned below resulting in the self-curing reaction. These acid group-containing ethylenically unsaturated monomers can be used in any suitable amount based upon the needs of the user, and in the case of latex formation can be present in amounts of at least 0.3, such as at least 1, such as at least 3, such as 0.3 to 5, such as 1 to 5 percent by weight, based on weight of monomers used in the first stage polymerization.

In addition to the hydroxy group, the carboxylic acid group and the other acid group-containing monomers used in the formation of the polymer, such as in the first stage polymerization, the monomer mixture may include other monomers such as alkyl (meth)acrylates such as methyl, ethyl, propyl, or butyl (meth)acrylate. Also multifunctional (meth)acrylate monomers, such as allyl methacrylate may be used if graft copolymers are desired. These (meth)acrylate monomers may be used in any suitable amount based upon the needs of the user, and in the case of latex formation can be present in the first stage monomer mixture in amounts of 0.5 to 40 percent by weight of the monomer mixture used in the first stage polymerization.

Optionally included in the polymer formation, such as in the first stage monomer mixture, are one or more non-(meth)acrylate monomers having alpha-beta ethylenic unsaturation. Examples include styrene, methylstyrene, vinyl esters, ethyl acrylate, methyl methacrylate, and acrylamide. These optional non-(meth)acrylate monomers can be used in any suitable amount based upon the needs of the user, and in the case of latex formation can be present in the first stage monomer mixture in amounts of less than 10 percent by weight of the monomer mixture used in the first stage polymerization.

According to the present invention, the polymer, latex, and/or coating compositions may exclude or be substantially free of one or more of styrene, ethyl acrylate, methyl methacrylate, acrylamide and/or vinyl chloride monomers; in this context "substantially free" means these monomers are not intentionally used in the polymerization of the polymer or the formation of the coating composition and are therefore present, if at all, in an amount of 1 wt % or less, based on total wt % of the monomers.

As noted above, the polymer formed in the first stage polymerization may be at least partially neutralized with a base to form the polymeric surfactant. Compounds that may be used include organic bases and inorganic bases. Examples of bases that may be used for neutralization include ammonia, ammonium hydroxide, methylethanolamine and dimethylethanolamine. The minimum extent to which the acid groups must be neutralized in order to provide stability to the latex can be readily determined by those of skill in the art for a particular composition. Typically, the polymeric surfactant is neutralized to 20 to 80 percent of the total theoretical neutralization equivalent.

Besides functioning as a polymeric surfactant or soap, the polymer prepared in the first stage polymerization may itself be used as a self-curing resinous binder in a coating composition. When used in this fashion, it may be in the form of an aqueous dispersion or in the form of a solution or dispersion in organic solvent.

The ethylenically unsaturated monomer component used in the second stage polymerization to form the core of the latex particles may be selected from a wide variety of ethylenically unsaturated monomers, including the ethylenically unsaturated monomers discussed above in connection with the first stage, such as the alkyl (meth)acrylates and the hydroxyalkyl (meth)acrylates. The alkyl (meth)acrylate monomers are typically present in amounts of 50 to 100 percent by weight based on weight of the monomer mixture used in the second stage polymerization. Non-(meth)acrylate unsaturated monomers may be included in the second stage polymerization as described above in connection with the first stage. The non-(meth)acrylate monomers in the second stage are typically present in amounts of less than 10 percent by weight based on weight of the monomer mixture used in the second stage polymerization or the core.

Optionally, an epoxy-functional ethylenically unsaturated monomer such as glycidyl (meth)acrylate may be included in the monomer mixture used in the second stage polymerization. When present, the epoxy-functional monomer is present in amounts of at least five (5), such as 5 to 30 percent by weight based on weight of the monomer mixture used in the second stage polymerization or the core.

Polymerization of the monomers in the first stage polymerization is typically conducted by organic solution polymerization techniques in the presence of a free radical initiator. The molecular weight of the polymeric surfactant is typically from 2,000 to 10,000 on a number average basis.

The relative proportions of the core and shell polymers may vary. Typically, a latex polymer in accordance with the present invention may include from 20 to 50 percent by weight of the shell polymer and from 50 to 80 percent of the core polymer. The percentage is based on total weight of the monomers used in the shell and the core. The core may constitute the major portion.

With regard to the conditions of the second stage emulsion polymerization, the ethylenically unsaturated monomer component can be polymerized in aqueous medium with a water-soluble free radical initiator in the presence of the polymeric soap.

The temperature of polymerization can be from 50 to 150° C. The pH of the aqueous medium can be maintained at a pH of 5 to 12.

The free radical initiator can be one or more water-soluble peroxides that are known to act as free radical initiators. Examples include hydrogen peroxide and t-butyl hydroperoxide. Redox initiator systems well known in the art (e.g., t-butyl hydroperoxide, erythorbic acid, and ferrous complexes) can also be employed. Persulfate initiators such as ammonium persulfate or potassium persulfate can also be used.

The second stage polymerization reaction of the ethylenically unsaturated monomer component in the presence of the aqueous dispersion of the polymeric surfactant may be conducted as a batch, intermittent, or continuous operation.

For example, the reactor can be charged with an appropriate amount of water, polymeric surfactant, and free radical initiator. The reactor is then heated to the free radical initiation temperature and then charged with the ethylenically unsaturated monomer component. Water, initiator, polymeric surfactant, and some portion of the ethylenically unsaturated monomer component can be initially charged to the vessel. There may also be some water miscible solvent present. After this initial charge is allowed to react for a period of time at polymerization temperature, the remaining ethylenically unsaturated monomer component is added incrementally with the rate of addition being varied depending on the polymerization temperature, the particular initiator being employed, and the type and amount of monomers being polymerized. After all the monomer component has been charged, a final heating is carried out to complete the polymerization. The reactor is then cooled and the latex recovered.

A coating composition of the present invention may also include other optional polymers that do not adversely affect the coating composition or a cured coating composition resulting therefrom. One or more optional polymers can be included in a sufficient amount to serve an intended purpose, but not in such an amount to adversely affect a coating composition or a cured coating composition resulting therefrom.

Such optional polymers include, for example, polyesters and polyethers. Such additional polymeric materials or monomers can be non-reactive or reactive with other components of the composition (e.g., the acid-functional polymer). If desired, reactive polymers can be incorporated into the compositions of the present invention to provide additional functionality for various purposes, including crosslinking. Examples of such reactive polymers include, for example, hydroxyl-functional polyesters and/or polyethers.

A coating composition of the present invention may also include other optional ingredients that do not adversely affect the coating composition or a cured coating composition resulting therefrom. Such optional ingredients are typically included in a coating composition to enhance composition aesthetics, to facilitate manufacturing, processing, handling, and application of the composition, and to further improve a particular functional property of a coating composition or a cured coating composition resulting therefrom.

Such optional ingredients include, for example, dyes, pigments, toners, extenders, fillers, lubricants, anticorrosion agents, flow control agents, thixotropic agents, dispersing agents, antioxidants, adhesion promoters, light stabilizers, surfactants, and mixtures thereof. Each optional ingredient is included in a sufficient amount to serve its intended purpose, but not in such an amount to adversely affect a coating composition or a cured coating composition resulting therefrom.

The compositions may be substantially free, may be essentially free and/or may be completely free of bisphenol A and derivatives or residues thereof, including bisphenol A ("BPA") and bisphenol A diglycidyl ether ("BADGE"). Such compositions are sometimes referred to as "BPA non intent" because BPA, including derivatives or residues thereof, are not intentionally added but may be present in trace amounts because of impurities or unavoidable contamination from the environment. The compositions can also be substantially free and may be essentially free and/or may be completely free of bisphenol F ("BPF") and derivatives or residues thereof, including bisphenol F and bisphenol F diglycidyl ether ("BFDGE"). The term "substantially free" as used in this context means the compositions contain less than 1000 parts per million (ppm), "essentially free" means less than 100 ppm and "completely free" means less than 20 parts per billion (ppb) of any of the above-mentioned compounds, derivatives or residues thereof.

In addition, the compositions of the present invention may be substantially free, may be essentially free and/or may be completely free of formaldehyde. The term "substantially free" as used in this context means the compositions contain, and/or release on cure, less than 1000 parts per million (ppm), "essentially free" means less than 100 ppm and "completely free" means less than 100 parts per billion (ppb) of formaldehyde compounds, derivatives or residues thereof.

The present compositions can be applied to any substrates known in the art, for example, automotive substrates, marine substrates, industrial substrates, packaging substrates, lumber, wood flooring and furniture, apparel, electronics including housings and circuit boards and including consumer electronics such as housings for computers, notebooks, smartphones, tablets, televisions, gaming equipment, computer equipment, computer accessories, MP3 players, and the like, glass and transparencies, sports equipment including golf balls, and the like. These substrates can be, for example, metallic or non-metallic. Metallic substrates include tin, steel, tin-plated steel, chromium passivated steel, galvanized steel, aluminum, and aluminum foil. Metal sheet as used herein refers to flat metal sheet and coiled metal sheet, which is coiled, uncoiled for coating and then re-coiled for shipment to a manufacturer. Non-metallic substrates include polymeric, plastic, polyester, polyolefin, polyamide, cellulosic, polystyrene, polyacrylic, poly(ethylene naphthalate), polypropylene, polyethylene, nylon, EVOH, polylactic acid, other "green" polymeric substrates, poly(ethyleneterephthalate) ("PET"), polycarbonate, polycarbonate acrylobutadiene styrene ("PC/ABS"), polyamide, wood, veneer, wood composite, particle board, medium density fiberboard, cement, stone, glass, paper, cardboard, textiles, leather both synthetic and natural, and the like. The substrate can be one that has been already treated in some manner, such as to impart visual and/or color effect.

The composition may also comprise a colorant, such as a pigmented basecoat used in conjunction with a clearcoat, or as a pigmented monocoat. Such coating layers are used in various industries to impart a decorative and/or protective finish. For example, such a coating or coating system may be applied to a vehicle. "Vehicle" is used herein in its broadest sense and includes all types of vehicles, such as but not limited to cars, trucks, buses, vans, golf carts, motorcycles, bicycles, railroad cars, boats, ships, airplanes, helicopters and the like. It will be appreciated that the portion of the vehicle that is coated according to the present invention may vary depending on why the coating is being used. For example, anti-chip primers may be applied to some of the portions of the vehicle. When used as a colored basecoat or monocoat, the present coatings will typically be applied to those portions of the vehicle that are visible such as the roof, hood, doors trunk lid and the like of a car, but may also be applied to other areas such as inside the trunk, inside the door and the like especially when the compositions are formulated as sealants or adhesives; for example, the compositions can be formulated so as to have a viscosity such that they provide sound and/or vibration damping to a vehicle. The present compositions can also be applied to those portions of the vehicle that are in contact with the driver and/or passengers, such as the steering wheel, dashboard, gear shift, controls, door handle and the like. Clearcoats will typically be applied to the exterior of a vehicle.

The compositions of the present invention are particularly suitable for use as packaging coatings. The application of various pretreatments and coatings to packaging is well established. Such treatments and/or coatings, for example, can be used in the case of metal cans, wherein the treatment and/or coating is used to retard or inhibit corrosion, provide a decorative coating, provide ease of handling during the manufacturing process, and the like. Coatings can be applied to the interior of such cans to prevent the contents from contacting the metal of the package. Contact between the metal and a food or beverage, for example, can lead to corrosion of a metal package, which can then contaminate the food or beverage. This is particularly true when the contents of the can are acidic in nature. The coatings applied to the interior of metal cans also help prevent corrosion in the headspace of the cans, which is the area between the fill line of the product and the can lid; corrosion in the headspace is particularly problematic with food products having a high salt content. Coatings can also be applied to the exterior of metal cans. Certain coatings of the present invention are particularly applicable for use with coiled metal stock, such as the coiled metal stock from which the ends of cans are made ("can end stock"), and end caps and closures are made ("cap/closure stock"). Since coatings designed for use on can end stock and cap/closure stock are typically applied prior to the piece being cut and stamped out of the coiled metal stock, they are typically flexible and extensible. For example, such stock is typically coated on both sides. Thereafter, the coated metal stock is punched. For can ends, the metal is then scored for the "pop-top" opening and the pop-top ring is then attached with a pin that is separately fabricated. The end is then attached to the can body by an edge rolling process. A similar procedure is done for "easy open" can ends. For easy open can ends, a score substantially around the perimeter of the lid allows for easy opening or removing of the lid from the can, typically by means of a pull tab. For caps and closures, the cap/closure stock is typically coated, such as by roll coating, and the cap or closure stamped out of the stock; it is possible, however, to coat the cap/closure after formation. Coatings for cans subjected to relatively stringent temperature and/or pressure requirements should also be resistant to popping, corrosion, blushing and/or blistering.

Accordingly, the present invention is directed to a package coated at least in part with any of the coating compositions described above. A "package" is anything used to contain another item, particularly for shipping from a point of manufacture to a consumer, and for subsequent storage by a consumer. A package will be therefore understood as something that is sealed so as to keep its contents free from deterioration until opened by a consumer. The manufacturer will often identify the length of time during which the food or beverage will be free from spoilage, which typically ranges from several months to years. Thus, the present "package" is distinguished from a storage package or bakeware in which a consumer might make and/or store food; such a package would only maintain the freshness or integrity of the food item for a relatively short period. "Package" as used herein means the complete package itself or any component thereof, such as an end, lid, cap, and the like. For example, a "package" coated with any of the coating compositions described herein might include a metal can in which only the can end or a portion thereof is coated. A package according to the present invention can be made of metal or non-metal, for example, plastic or laminate, and be in any form. An example of a suitable package is a laminate tube. Another example of a suitable package is metal can. The term "metal can" includes any type of metal can, package or any type of receptacle or portion thereof that is sealed by the food/beverage manufacturer to minimize or eliminate spoilage of the contents until such package is opened by the consumer. One example of a metal can is a food can; the term "food can(s)" is used herein to refer to cans, packages or any type of receptacle or portion thereof used to hold any type of food and/or beverage. "Beverage can" may also be used to refer more specifically to a food can in which a beverage is packaged. The term "metal can(s)" specifically includes food cans, including beverage cans, and also specifically includes "can ends" including "E-Z open ends", which are typically stamped from can end stock and used in conjunction with the packaging of food and beverages. The term "metal cans" also specifically includes metal caps and/or closures such as bottle caps, screw top caps and lids of any size, lug caps, and the like. The metal cans can be used to hold other items as well, including, but not limited to, personal care products, bug spray, spray paint, and any other compound suitable for packaging in an aerosol can. The cans can include "two piece cans" and "three-piece cans" as well as drawn and ironed one-piece cans; such one piece cans often find application with aerosol products. Packages coated according to the present invention can also include plastic bottles, plastic tubes, laminates and flexible packaging, such as those made from PE, PP, PET and the like. Such packaging could hold, for example, food, toothpaste, personal care products and the like.

The coating can be applied to the interior and/or the exterior of the package. For example, the coating can be rollcoated onto metal used to make a two-piece food can, a three-piece food can, can end stock and/or cap/closure stock. The coating is applied to a coil or sheet by roll coating; the coating is then cured by radiation and can ends are stamped out and fabricated into the finished product, i.e. can ends. The coating could also be applied as a rim coat to the bottom of the can; such application can be by roll coating. The rim coat functions to reduce friction for improved handling during the continued fabrication and/or processing of the can. The coating can be applied to the "side stripe" of a metal can, which will be understood as the seam formed during fabrication of a three-piece can. The coating can also be applied to caps and/or closures; such application can include, for example, a protective varnish that is applied before and/or after formation of the cap/closure and/or a pigmented enamel post applied to the cap, particularly those having a scored seam at the bottom of the cap. Decorated can stock can also be partially coated externally with the coating described herein, and the decorated, coated can stock used to form various metal cans. The coating can be applied to can stock before formation of the can or can part, or can be applied to the can or can part after formation.

Any material used for the formation of food cans can be treated according to the present methods. Particularly suitable substrates include tin-plated steel, tin-free steel and black-plated steel.

The present invention is therefore further directed to a method of coating a package comprising applying to at least a portion of the package any of the coating compositions described above, and curing the coating. Two-piece cans are manufactured by joining a can body (typically a drawn metal body) with a can end (typically a drawn metal end). The coatings of the present invention are suitable for use in food contact situations and may be used on the inside of such cans. They are particularly suitable for spray applied, liquid coatings for the interior of two-piece drawn and ironed beverage cans and coil coatings for food can ends. The present invention also offers utility in other applications. These additional applications include, but are not limited to, wash coating, sheet coating, and side seam coatings.

Spray coating includes the introduction of the coating composition into the inside of a preformed package. Typical preformed packages suitable for spray coating include food cans, beer and beverage packages, and the like. The spray may utilize a spray nozzle capable of uniformly coating the inside of the preformed package. The sprayed preformed package is then subjected to heat to remove the residual solvents and cure the coating. For food inside spray, the curing conditions involve maintaining the temperature measured at the can dome at 350 to 500° F. for 0.5 to 30 minutes.

A coil coating is described as the coating of a continuous coil composed of a metal (e.g., steel or aluminum). Once coated, the coating coil is subjected to a short thermal, ultraviolet, and/or electromagnetic curing cycle, for hardening (e.g., drying and curing) of the coating. Coil coatings provide coated metal (e.g., steel and/or aluminum) substrates that can be fabricated into formed articles, such as 2-piece drawn food cans, 3-piece food cans, food can ends, drawn and ironed cans and the like.

A wash coating is commercially described as the coating of the exterior of two-piece drawn and ironed ("D&I") cans with a thin layer of protectant coating. The exterior of these D&I cans are "wash-coated" by passing pre-formed two-piece D&I cans under a curtain of a coating composition. The cans are inverted, that is, the open end of the can is in the "down" position when passing through the curtain. This curtain of coating composition takes on a "waterfall-like" appearance. Once these cans pass under this curtain of coating composition, the liquid coating material effectively coats the exterior of each can. Excess coating is removed through the use of an "air knife." Once the desired amount of coating is applied to the exterior of each can, each can is passed through a thermal, ultraviolet, and/or electromagnetic curing oven to harden (e.g., dry and cure) the coating.

A sheet coating is described as the coating of separate pieces of a variety of materials (e.g., steel or aluminum) that have been pre-cut into square or rectangular "sheets." Typical dimensions of these sheets are approximately one square meter. Once coated, each sheet is cured. Once hardened (e.g., dried and cured), the sheets of the coated substrate are collected and prepared for subsequent fabrication. Sheet coatings provide coated metal (e.g., steel or aluminum) substrate that can be successfully fabricated into formed articles, such as 2-piece drawn food cans, 3-piece food cans, food can ends, drawn and ironed cans and the like.

A side seam coating is described as the application of a coating over the welded area of formed three-piece food cans. When three-piece food cans are being prepared, a rectangular piece of coated substrate is formed into a cylinder. The formation of the cylinder is rendered permanent due to the welding of each side of the rectangle via thermal welding. Once welded, each can typically require a layer of coating, which protects the exposed "weld" from subsequent corrosion or other effects to the contained foodstuff. The coatings that function in this role are termed "side seam stripes". Typical side seam stripes are spray applied and cured quickly via residual heat from the welding operation in addition to a small thermal, ultraviolet, and/or electromagnetic oven.

ASPECTS OF THE INVENTION

Non-limiting aspects of the present invention include:
1. A self-curing coating composition comprising a polymer containing hydroxyl groups, carboxylic acid groups and acid groups comprising sulfonic acid groups and/or phosphoric acid groups.
2. The coating composition of aspect 1 wherein the polymer is prepared from a mixture of ethylenically unsaturated monomers comprising (i) a monomer comprising a sulfonic acid group-containing ethylenically unsaturated monomer and/or a phosphoric acid group-containing ethylenically unsaturated monomer; (ii) a carboxylic acid group-containing ethylenically unsaturated monomer and (iii) a hydroxyl group-containing ethylenically unsaturated monomer.
3. The coating composition of aspect 2 in which (i) is present in an amount of at least 0.3 percent by weight based on the weight of the mixture of ethylenically unsaturated monomers.
4. The coating composition of any preceding aspect in which (ii) is present in an amount of at least 5 percent by weight based on weight of the mixture of ethylenically unsaturated monomers.
5. The coating composition of any preceding aspect in which (iii) is present in an amount of at least 5 percent by weight based on weight of the mixture of ethylenically unsaturated monomers.
6. The coating composition of any preceding aspect in which the molar ratio of carboxylic acid groups to hydroxyl groups is sufficient to effect cure of the coating compositions, such as from 0.5 to 1.5:1
7. A self-curing coating composition comprising an emulsion polymerized latex polymer which comprises the reaction product of (a) an ethylenically unsaturated monomer component in the presence of
(b) an aqueous dispersion of an at least partially neutralized polymer containing hydroxyl groups, carboxylic acid groups and sulfonic and/or phosphoric acid groups.

8. The coating composition of any preceding aspect, which is substantially free, essentially free and/or completely free of bisphenol A; and/or substantially free, essentially free and/or completely free of formaldehyde; and/or substantially free of styrene; and/or substantially free, essentially free and/or completely free of bisphenol F; and/or substantially free, essentially free and/or completely free of ethyl acrylate; and/or substantially free, essentially free and/or completely free of methyl methacrylate; and/or substantially free, essentially free and/or completely free of acrylamide; and/or substantially free, essentially free and/or completely free of vinyl chloride.
9. The coating composition of aspect 7 or 8 in which (b) is prepared from a mixture of ethylenically unsaturated monomers comprising comprising (i) a monomer comprising a sulfonic acid group-containing ethylenically unsaturated monomer and/or a phosphoric acid group-containing ethylenically unsaturated monomer; (ii) a carboxylic acid group-containing ethylenically unsaturated monomer and (iii) a hydroxyl group-containing ethylenically unsaturated monomer
10. The coating composition of aspect 9 in which (i) is present in an amount of at least one 1 or at least three 3 percent by weight based on weight of ethylenically unsaturated monomers in (b).
11. The coating composition of aspect 9 or 10 in which (ii) is present in an amount of at least 5 or greater than 12 or at least 20 percent by weight of the ethylenically unsaturated monomers in (b).
12. The coating composition of any of aspects 9 to 11 in which (iii) is present in an amount of at least 5 or at least 20 percent by weight based on weight of ethylenically unsaturated monomers in (b).
13. The coating composition of any of aspects 7 or 9 to 12 in which the ethylenically unsaturated monomer component of (a) comprises an epoxy group-containing ethylenically unsaturated monomer.
14. The coating composition of aspect 13 in which the epoxy group-containing ethylenically unsaturated monomer is present in an amount of at least five 5 percent by weight based on weight of ethylenically unsaturated monomer component of (a).
15. The coating composition of aspects 7 or 9 to 14 in which the reaction product has a Tg of at least 25° C. or at least 60° C.
16. The coating composition of aspects 7 or 9 to 15 in which the emulsion polymerized latex polymer is substantially free of styrene.
17. The coating composition of aspects 7 to 16 in which the molar ratio of carboxylic acid groups to hydroxyl groups is from 0.5:1 to 1.5:1.
18. A method of coating a package comprising:
(c) applying the composition of any of the preceding aspects to at least a portion of the package before and/or after forming the package, and
(d) curing the coating.
19. The method of aspect 18 wherein applying the composition to the package comprises applying the composition to a metal substrate in the form of a planar coil or sheet, curing the emulsion polymerized latex polymer, and forming the substrate into a metal can or portion thereof.

20. The method of aspect 19 wherein forming the substrate into a metal can or portion thereof comprises forming the substrate into a can end or a can body.
21. The method of aspect 20 wherein the can is a 2-piece drawn metal can, 3-piece metal can, metal can end or a drawn and ironed can.
22. The method of any of aspects 18 to 21 wherein the metal substrate comprises steel or aluminum.
23. The method of any of aspects 18, 19 or 22 wherein applying the composition to a metal substrate comprises applying the composition to the metal substrate after the metal substrate is formed into a can or portion thereof.
24. The method of any one of aspects 18 to 23 in which after applying the composition comprising the emulsion polymerized latex polymer to the metal substrate, the coating is cured by heating the coated substrate at a temperature of 350 to 500° F. for 0.5 to 10 minutes.
25. A package comprising:
   a self-curing coating composition disposed thereon, wherein the coating composition is any of the coating compositions described in aspects 1-18.
26. The package of aspect 25 in which the coating composition is the composition of any one of aspects 7 to 17 and/or the coating has been disposed on the body and/or end portion of the package according the method of any of aspects 18 to 24.
27. The package of aspect 25 or 26 which is a food package and in which the coating composition is applied to a food-contacting surface.
28. The package of aspect 27 wherein the package is a 2-piece drawn metal can, 3-piece metal can, metal can end or a drawn and ironed can.
29. The coating composition, method, or packaging of any preceding aspect, which is substantially free, essentially free and/or completely free of bisphenol A; and/or substantially free, essentially free and/or completely free of formaldehyde; and/or substantially free of styrene; and/or substantially free, essentially free and/or completely free of bisphenol F; and/or substantially free, essentially free and/or completely free of ethyl acrylate; and/or substantially free, essentially free and/or completely free of methyl methacrylate; and/or substantially free, essentially free and/or completely free of acrylamide; and/or substantially free, essentially free and/or completely free of vinyl chloride.

EXAMPLES

The following examples are offered to aid in the understanding of the invention and are not to be construed as limiting the scope thereof. Unless otherwise indicated, all parts and percentages are by weight.

Example 1

Latex with 1 Percent by Weight 2-Sulfoethyl Methacrylate (SEMA) in Soap

Acrylic soap "1A" with 1 percent by weight SEMA was made as follows:

| Ingredients | | Parts by Weight |
|---|---|---|
| n-Butanol | Charge #1 | 370.73 |
| Dimethylethanolamine | | 11.68 |
| Hydroxyethyl Methacrylate | Charge #2 | 350.36 |

| Ingredients | | Parts by Weight |
|---|---|---|
| n-Butyl Acrylate | | 455.47 |
| Acrylic Acid | | 175.18 |
| Methyl Methacrylate | | 175.18 |
| 2-Sulfoethyl Methacrylate | | 11.68 |
| n-Butanol | | 49.50 |
| tert-Butyl Peroctoate | Charge #3 | 23.89 |
| n-Butanol | | 44.37 |
| n-Butanol | Charge #4 | 28.56 |
| tert-Butyl Peroctoate | Charge #5 | 2.14 |
| n-Butanol | | 3.98 |
| n-Butanol | Charge #6 | 2.86 |
| Dimethylethanolamine | Charge #7 | 54.94 |
| DI Water | Charge #8 | 2219.16 |

A five-liter round bottom, four-necked flask equipped with an agitator, a nitrogen inlet tube, a thermometer, and a reflux condenser was charged with Charge #1. The flask was heated gradually to reflux at around 118° C. Reflux was maintained during the polymerization. In a separate vessel, a mixture of Charge #2 and Charge #3 was prepared. At 118° C. reflux condition, the Charge #2/#3 mixture was added to the flask at a steady rate over 4 hours. When completed, the Charge #2/#3 mixture vessel was rinsed with Charge #4 which was added to the flask. The batch was held under reflux at about 120° C. for 10 minutes. Then Charge #5 was added into the flask over 15 minutes to convert the residual monomers, followed by a line rinse of Charge #6. The batch was then held for 1 hour under reflux. When the reaction was completed, the batch was then cooled down to <100° C., when Charge #7 was added over 5 minutes followed by Charge #8. This batch yielded a polymer dispersion with 30% NV, and a number average molecular weight of 5,000.

Acrylic latex "1B" using acrylic soap "1A" was made as follows:

| Ingredients | | Parts by Weight |
|---|---|---|
| Acrylic soap "1A" | Charge #1 | 517.5 |
| DI Water | | 1305.54 |
| Dimethylethanolamine | | 5.78 |
| Hydrogen Peroxide 35% in water | Charge #2 | 4.04 |
| DI Water | | 24.27 |
| Glycidyl Methacrylate | Charge #3 | 30.93 |
| Ethyl Acrylate | | 82.48 |
| Methyl Methacrylate | | 298.98 |
| Benzoin | | 5.45 |
| DI Water | Charge #4 | 13.89 |
| Hydrogen Peroxide 35% in water | Charge #5 | 1.41 |
| DI Water | | 8.46 |
| DI Water | Charge #6 | 1.27 |

A three-liter round bottom, four-necked flask equipped with an agitator, a nitrogen inlet tube, a thermometer, and a reflux condenser was charged with Charge #1. The flask was heated gradually to 70° C. At 70° C., Charge #2 was added to the flask at a steady rate over 125 minutes, and 5 minutes later Charge #3 was fed in over 2 hours. When both charges were completed, Charge #4 was added as monomer rinse and the batch was held at 70° C. for 10 minutes. Then 50% of Charge #5 was added into the flask over 20 minutes to convert the residual monomers, followed by a 30 minutes hold. After the hold, the rest 50% of Charge #5 was added over 20 minutes, followed by 1 hour hold. Then the batch was heated to 90° C. and held for 1 hour to complete the reaction. The latex was cooled down and filtered with 1 μm filter bag. This batch yielded a latex with 24.6% NV, and a particle size of 68 nm.

Example 2

Latex with 5 Percent by Weight SEMA in Soap

Acrylic soap "2A" with 5 percent by weight SEMA was made as follows:

| Ingredients | | Parts by Weight |
|---|---|---|
| n-Butanol | Charge #1 | 251.52 |
| Dimethylethanolamine | | 39.62 |
| Hydroxyethyl Methacrylate | Charge #2 | 237.70 |
| n-Butyl Acrylate | | 285.24 |
| Acrylic Acid | | 118.85 |
| Methyl Methacrylate | | 110.93 |
| 2-Sulfoethyl Methacrylate | | 39.62 |
| n-Butanol | | 1.89 |
| tert-Butyl Peroctoate | Charge #3 | 16.21 |
| n-Butanol | | 30.10 |
| n-Butanol | Charge #4 | 19.37 |
| tert-Butyl Peroctoate | Charge #5 | 1.45 |
| n-Butanol | | 2.70 |
| n-Butanol | Charge #6 | 1.94 |
| Dimethylethanolamine | Charge #7 | 9.94 |
| DI Water | Charge #8 | 1532.91 |

A three-liter round bottom, four-necked flask equipped with an agitator, a nitrogen inlet tube, a thermometer, and a reflux condenser was charged with Charge #1. The flask was heated gradually to reflux at around 118° C. Reflux was maintained during the polymerization. In a separate vessel, a mixture of Charge #2 and Charge #3 was prepared. At 118° C. reflux condition, the Charge #2/#3 mixture was added to the flask at a steady rate over 4 hours. When completed, the Charge #2/#3 mixture vessel was rinsed with Charge #4 which was added to the flask. The batch was held under reflux at about 120° C. for 10 minutes. Then Charge #5 was added into the flask over 15 minutes to convert the residual monomers, followed by a line rinse of Charge #6. The batch was then held for 1 hour under reflux. When the reaction was completed, the batch was then cooled down to <100° C., when Charge #7 was added over 5 minutes followed by Charge #8. This batch yielded a polymer dispersion with 30% NV, and a number average molecular weight of 6,000.

Acrylic latex "2B" using acrylic soap "2A" was made as follows:

| Ingredients | | Parts by Weight |
|---|---|---|
| Acrylic soap "2A" | Charge #1 | 517.5 |
| DI Water | | 1305.54 |
| Dimethylethanolamine | | 5.78 |
| Hydrogen Peroxide 35% in water | Charge #2 | 4.04 |
| DI Water | | 24.27 |
| Glycidyl Methacrylate | Charge #3 | 30.93 |
| Ethyl Acrylate | | 82.48 |
| Methyl Methacrylate | | 298.98 |
| Benzoin | | 5.45 |
| DI Water | Charge #4 | 13.89 |
| Hydrogen Peroxide 35% in water | Charge #5 | 1.41 |
| DI Water | | 8.46 |
| DI Water | Charge #6 | 1.27 |

A three-liter round bottom, four-necked flask equipped with an agitator, a nitrogen inlet tube, a thermometer, and a reflux condenser was charged with Charge #1. The flask was heated gradually to 70° C. At 70° C., Charge #2 was added to the flask at a steady rate over 125 minutes, and 5 minutes later Charge #3 was fed in over 2 hours.

When both charges were completed, Charge #4 was added as monomer rinse and the batch was held at 70° C. for 10 minutes. Then 50% of Charge #5 was added into the flask over 20 minutes to convert the residual monomers, followed by a 30 minutes hold. After the hold, the rest 50% of Charge #5 was added over 20 minutes, followed by 1 hour hold. Then the batch was heated to 90° C. and held for 1 hour to complete the reaction. The latex was cooled down and filtered with 1 μm filter bag. This batch yielded a latex with 24.6% NV, and a particle size of 70 nm.

Test Results for the Effect of % SEMA

Two coatings were prepared by drawing down latex samples "1B", and "2B" over beverage aluminum can body substrate at a film weight of 3 msi (milligram per square inch). The coatings were baked for 3 minutes at 380° F. as-is without external crosslinker. The coatings were evaluated as shown in the Table below.

| | Wt % SEMA | | | | | | |
|---|---|---|---|---|---|---|---|
| | On soap | On latex | MEK Double | 1% Joy | | 3% Acetic Acid | |
| Example | solids | solids | Rubs | Blush | Adhesion | Blush | Adhesion |
| 1B | 1% | 0.27 | 10 | 8 | 100 | 7 | 100 |
| 2B | 5% | 1.35 | 18 | 8 | 100 | 2 | 50 |

Test Methods

The following test methods were utilized in the Examples.

MEK Double Rubs: The number of double (back and forth) rubs by hand with a methyl ethyl ketone saturated cloth to remove the coating from the substrate.

Blush Resistance: Blush resistance measures the ability of a coating to resist attack by various testing solutions. When the coated film absorbs test solution, it generally becomes cloudy or looks white. Blush is measured visually using a scale of 0-10 where a rating of "10" indicates no blush and a rating of "0" indicates complete whitening of the film. The testing solution covers half of the panel being tested so you can compare blush of the exposed panel to the unexposed portion.

Adhesion: Adhesion testing is performed to assess whether the coating adheres to the substrate. The adhesion test is performed according to ASTM D3359—Test Method B, using Scotch 610 tape, available from 3M Company of Saint Paul, Minn. Adhesion is generally rated on a scale of 0-100 where a rating of "100" indicates no adhesion failure and a rating of "0" indicates no adhesion.

Joy Detergent Test: The "Joy" test is designed to measure the resistance of a coating to a hot 180° F. (82° C.) Joy detergent solution. The solution is prepared by mixing 30 grams of Ultra Joy Dishwashing Liquid (product of Procter & Gamble) into 3,000 grams of deionized water. Coated strips are immersed into the 180° F. (82° C.) Joy solution for 10 minutes. The strips are then rinsed and cooled in deionized water, dried, and immediately rated for blush and adhesion as described previously.

Acetic Acid Test: The "Acetic Acid" test is designed to measure the resistance of a coating to a boiling 3% acetic acid solution. The solution is prepared by mixing 90 grams of Glacial Acetic Acid (product of Fisher Scientific) into 3,000 grams of deionized water. Coated strips are immersed into the boiling Acetic Acid solution for 30 minutes. The strips are then rinsed and cooled in deionized water, dried, and immediately rated for blush and adhesion as described previously and visually assessed by the naked eye for the formation of microblisters.

As shown in the Table above, when weight percentage of SEMA in soap is increased, a dramatic increase of MEK double rubs was seen, although the coating lost 50% adhesion and had a blush of 2 after 3% acetic acid test.

Example 3

Latex with 120 Acid Number (AN) Soap

Acrylic soap "3A" with 120 acid number was made as follows:

| Ingredients | | Parts by Weight |
|---|---|---|
| n-Butanol | Charge #1 | 370.73 |
| Dimethylethanolamine | | 11.68 |
| Hydroxyethyl Methacrylate | Charge #2 | 350.36 |
| n-Butyl Acrylate | | 116.79 |
| Acrylic Acid | | 175.18 |
| Methyl Methacrylate | | 513.86 |
| 2-Sulfoethyl Methacrylate | | 11.68 |
| n-Butanol | | 40.79 |
| tert-Butyl Peroctoate | Charge #3 | 29.99 |
| n-Butanol | | 55.70 |
| n-Butanol | Charge #4 | 28.56 |
| tert-Butyl Peroctoate | Charge #5 | 2.14 |
| n-Butanol | | 3.98 |
| n-Butanol | Charge #6 | 2.86 |
| Dimethylethanolamine | Charge #7 | 54.94 |
| DI Water | Charge #8 | 2230.78 |

A five-liter round bottom, four-necked flask equipped with an agitator, a nitrogen inlet tube, a thermometer, and a reflux condenser was charged with Charge #1. The flask was heated gradually to reflux at around 118° C. Reflux was maintained during the polymerization. In a separate vessel, a mixture of Charge #2 and Charge #3 was prepared. At 118° C. reflux condition, the Charge #2/#3 mixture was added to the flask at a steady rate over 4 hours. When completed, the Charge #2/#3 mixture vessel was rinsed with Charge #4 which was added to the flask. The batch was held under reflux at about 120° C. for 10 minutes. Then Charge #5 was added into the flask over 15 minutes to convert the residual monomers, followed by a line rinse of Charge #6. The batch was then held for 1 hour under reflux. When the reaction was completed, the batch was then cooled down to <100° C., when Charge #7 was added over 5 minutes followed by Charge #8. This batch yielded a polymer dispersion with 29.7% NV, and a number average molecular weight of 6,000.

Acrylic latex "3B" using acrylic soap "3A" was made as follows:

| Ingredients | | Parts by Weight |
|---|---|---|
| Acrylic soap "3A" | Charge #1 | 900.00 |
| DI Water | | 2280.55 |
| Hydrogen Peroxide 35% in water | Charge #2 | 7.04 |
| DI Water | | 42.19 |
| Glycidyl Methacrylate | Charge #3 | 53.74 |
| Ethyl Acrylate | | 304.86 |

-continued

| Ingredients | | Parts by Weight |
|---|---|---|
| Methyl Methacrylate | | 358.60 |
| Benzoin | | 9.49 |
| DI Water | Charge #4 | 24.16 |
| Hydrogen Peroxide 35% in water | Charge #5 | 2.45 |
| DI Water | | 14.72 |
| DI Water | Charge #6 | 2.21 |

A five-liter round bottom, four-necked flask equipped with an agitator, a nitrogen inlet tube, a thermometer, and a reflux condenser was charged with Charge #1. The flask was heated gradually to 70° C. At 70° C., Charge #2 was added to the flask at a steady rate over 125 minutes, and 5 minutes later Charge #3 was fed in over 2 hours. When both charges were completed, Charge #4 was added as monomer rinse and the batch was held at 70° C. for 10 minutes. Then 50% of Charge #5 was added into the flask over 20 minutes to convert the residual monomers, followed by a 30 minutes hold. After the hold, the rest 50% of Charge #5 was added over 20 minutes, followed by 1 hour hold. Then the batch was heated to 90° C. and held for 1 hour to complete the reaction. The latex was cooled down and filtered with 1 μm filter bag. This batch yielded a latex with 25% NV, and a particle size of 75 nm.

Example 4

Latex with 190 AN Soap

Acrylic soap "4A" with 190 acid number was made as follows:

| Ingredients | | Parts by Weight |
|---|---|---|
| n-Butanol | Charge #1 | 250.24 |
| Dimethylethanolamine | | 7.88 |
| Hydroxyethyl Methacrylate | Charge #2 | 236.49 |
| n-Butyl methacrylate | | 197.08 |
| Acrylic Acid | | 189.19 |
| Methyl Methacrylate | | 157.66 |
| 2-Sulfoethyl Methacrylate | | 7.88 |
| n-Butanol | | 27.53 |
| tert-Butyl Peroctoate | Charge #3 | 20.25 |
| n-Butanol | | 37.60 |
| n-Butanol | Charge #4 | 19.28 |
| tert-Butyl Peroctoate | Charge #5 | 1.45 |
| n-Butanol | Charge #6 | 1.93 |
| Dimethylethanolamine | Charge #7 | 39.65 |
| DI Water | Charge #8 | 1503.21 |

A three-liter round bottom, four-necked flask equipped with an agitator, a nitrogen inlet tube, a thermometer, and a reflux condenser was charged with Charge #1. The flask was heated gradually to reflux at around 118° C. Reflux was maintained during the polymerization. In a separate vessel, a mixture of Charge #2 and Charge #3 was prepared. At 118° C. reflux condition, the Charge #2/#3 mixture was added to the flask at a steady rate over 4 hours. When completed, the Charge #2/#3 mixture vessel was rinsed with Charge #4 which was added to the flask. The batch was held under reflux at about 120° C. for 10 minutes. Then Charge #5 was added into the flask over 15 minutes to convert the residual monomers, followed by a line rinse of Charge #6. The batch was then held for 1 hour under reflux. When the reaction was completed, the batch was then cooled down to <100° C., when Charge #7 was added over 5 minutes followed by Charge #8. This batch yielded a polymer dispersion with 30% NV, and a number average molecular weight of 5,500.

Acrylic latex "4B" using acrylic soap "4A" was made as follows:

| Ingredients | | Parts by Weight |
|---|---|---|
| Acrylic soap "4A" | Charge #1 | 270.00 |
| DI Water | | 684.16 |
| Hydrogen Peroxide 35% in water | Charge #2 | 2.11 |
| DI Water | | 12.66 |
| Glycidyl Methacrylate | Charge #3 | 16.14 |
| Ethyl Acrylate | | 91.44 |
| Methyl Methacrylate | | 107.58 |
| Benzoin | | 2.85 |
| DI Water | Charge #4 | 7.25 |
| Hydrogen Peroxide 35% in water | Charge #5 | 0.74 |
| DI Water | | 4.41 |
| DI Water | Charge #6 | 0.66 |

A three-liter round bottom, four-necked flask equipped with an agitator, a nitrogen inlet tube, a thermometer, and a reflux condenser was charged with Charge #1. The flask was heated gradually to 70° C. At 70° C., Charge #2 was added to the flask at a steady rate over 125 minutes, and 5 minutes later Charge #3 was fed in over 2 hours. When both charges were completed, Charge #4 was added as monomer rinse and the batch was held at 70° C. for 10 minutes. Then 50% of Charge #5 was added into the flask over 20 minutes to convert the residual monomers, followed by a 30 minutes hold. After the hold, the rest 50% of Charge #5 was added over 20 minutes, followed by 1 hour hold. Then the batch was heated to 90° C. and held for 1 hour to complete the reaction. The latex was cooled down and filtered with 1 μm filter bag. This batch yielded a latex with 25% NV, and a particle size of 79 nm.

Test Results for the Effect of Acid Number

Two coatings were prepared by drawing down latex samples "3B" and "4B" over beverage aluminum can body substrate at a film weight of 3 msi (milligram per square inch). The coatings were baked for 3 minutes at 380° F. as-is without external crosslinker. The coatings were evaluated for MEK double rubs, Joy pasteurization and acetic acid resistance.

| Latex Example | Wt % Acrylic Acid | | MEK Double Rubs | 1% Joy | | 3% Acetic Acid | | |
|---|---|---|---|---|---|---|---|---|
| | On soap solids | On latex solids | | Blush | Adhesion | Blush | Adhesion | Microblisters |
| 3B | 15% | 4.05 | 7 | 7 | 100 | 7 | 100 | Yes |
| 4B | 24% | 6.48 | 9 | 7 | 100 | 7 | 100 | No |

As shown in the Table above, when weight percentage of acrylic acid in soap is increased from 15% to 24%, the microblister disappeared after 3% acetic acid test.

Example 5

Latex with No Hydroxyethyl Methacrylate (HEMA) in Soap

Acrylic soap "5A" without HEMA was made as follows:

| Ingredients | | Parts by Weight |
|---|---|---|
| n-Butanol | Charge #1 | 251.52 |
| Dimethylethanolamine | | 7.92 |
| Ethyl Acrylate | Charge #2 | 71.31 |
| n-Butyl Acrylate | | 79.23 |
| Acrylic Acid | | 118.85 |
| Methyl Methacrylate | | 515.02 |
| 2-Sulfoethyl Methacrylate | | 7.92 |
| n-Butanol | | 33.59 |
| tert-Butyl Peroctoate | Charge #3 | 16.21 |
| n-Butanol | | 30.10 |
| n-Butanol | Charge #4 | 19.37 |
| tert-Butyl Peroctoate | Charge #5 | 1.45 |
| n-Butanol | | 2.70 |
| n-Butanol | Charge #6 | 1.94 |
| Dimethylethanolamine | Charge #7 | 37.27 |
| DI Water | Charge #8 | 1505.58 |

A three-liter round bottom, four-necked flask equipped with an agitator, a nitrogen inlet tube, a thermometer, and a reflux condenser was charged with Charge #1. The flask was heated gradually to reflux at around 118° C. Reflux was maintained during the polymerization. In a separate vessel, a mixture of Charge #2 and Charge #3 was prepared. At 118° C. reflux condition, the Charge #2/#3 mixture was added to the flask at a steady rate over 4 hours. When completed, the Charge #2/#3 mixture vessel was rinsed with Charge #4 which was added to the flask. The batch was held under reflux at about 120° C. for 10 minutes. Then Charge #5 was added into the flask over 15 minutes to convert the residual monomers, followed by a line rinse of Charge #6. The batch was then held for 1 hour under reflux. When the reaction was completed, the batch was then cooled down to <100° C., when Charge #7 was added over 5 minutes followed by Charge #8. This batch yielded a polymer dispersion with 30.35% NV, and a number average molecular weight of 6,300.

Acrylic latex "5B" using acrylic soap "5A" was made as follows:

| Ingredients | | Parts by Weight |
|---|---|---|
| Acrylic soap "5A" | Charge #1 | 450.00 |
| DI Water | | 1131.49 |
| Dimethylethanolamine | | 8.79 |
| Hydrogen Peroxide 35% in water | Charge #2 | 3.51 |
| DI Water | | 21.10 |
| Glycidyl Methacrylate | Charge #3 | 26.89 |
| Ethyl Acrylate | | 35.86 |
| Methyl Methacrylate | | 188.26 |
| Hydroxyethyl Methacrylate | | 107.58 |
| Benzoin | | 4.74 |
| DI Water | Charge #4 | 12.08 |
| Hydrogen Peroxide 35% in water | Charge #5 | 1.23 |
| DI Water | | 7.36 |
| DI Water | Charge #6 | 1.11 |

A three-liter round bottom, four-necked flask equipped with an agitator, a nitrogen inlet tube, a thermometer, and a reflux condenser was charged with Charge #1. The flask was heated gradually to 70° C. At 70° C., Charge #2 was added to the flask at a steady rate over 125 minutes, and 5 minutes later Charge #3 was fed in over 2 hours. When both charges were completed, Charge #4 was added as monomer rinse and the batch was held at 70° C. for 10 minutes. Then 50% of Charge #5 was added into the flask over 20 minutes to convert the residual monomers, followed by a 30 minutes hold. After the hold, the rest 50% of Charge #5 was added over 20 minutes, followed by 1 hour hold. Then the batch was heated to 90° C. and held for 1 hour to complete the reaction. The latex was cooled down and filtered with 1 μm filter bag. This batch yielded a latex with 24.85% NV, and a particle size of 79 nm.

Example 6

Latex with HEMA in Both Soap and Latex

Acrylic latex "3C" using acrylic soap "3A" was made as follows:

| Ingredients | | Parts by Weight |
|---|---|---|
| Acrylic soap "3A" | Charge #1 | 450.00 |
| DI Water | | 1140.27 |
| Hydrogen Peroxide 35% in water | Charge #2 | 3.51 |
| DI Water | | 21.10 |
| Glycidyl Methacrylate | Charge #3 | 26.89 |
| Ethyl Acrylate | | 148.82 |
| Methyl Methacrylate | | 155.99 |
| Hydroxyethyl Methacrylate | | 26.89 |
| Benzoin | | 4.74 |
| DI Water | Charge #4 | 12.08 |
| Hydrogen Peroxide 35% in water | Charge #5 | 1.23 |
| DI Water | | 7.36 |
| DI Water | Charge #6 | 1.11 |

A three-liter round bottom, four-necked flask equipped with an agitator, a nitrogen inlet tube, a thermometer, and a reflux condenser was charged with Charge #1. The flask was heated gradually to 70° C. At 70° C., Charge #2 was added to the flask at a steady rate over 125 minutes, and 5 minutes later Charge #3 was fed in over 2 hours. When both charges were completed, Charge #4 was added as monomer rinse and the batch was held at 70° C. for 10 minutes. Then 50% of Charge #5 was added into the flask over 20 minutes to convert the residual monomers, followed by a 30 minutes hold. After the hold, the rest 50% of Charge #5 was added over 20 minutes, followed by 1 hour hold. Then the batch was heated to 90° C. and held for 1 hour to complete the reaction. The latex was cooled down and filtered with 1 μm filter bag. This batch yielded a latex with 25% NV, and a particle size of 74 nm.

Test Results for the Effect of Hydroxyl Level

Three coatings were prepared by drawing down latex samples "3B", "3C", and "5B" over beverage aluminum can body substrate at a film weight of 3 msi (milligram per square inch). The coatings were baked for 3 minutes at 380° F. as-is without external crosslinker. The coatings were evaluated for MEK double rubs, Joy pasteurization and acetic acid resistance.

| | Wt % HEMA | | | | | | | | |
|---|---|---|---|---|---|---|---|---|---|
| | On soap | On latex | On latex | MEK Double | 1% Joy | | 3% Acetic Acid | | |
| Example | solids | core | solids | Rubs | Blush | Adhesion | Blush | Adhesion | Microblisters |
| 3B | 30% | 0% | 8.1 | 7 | 7 | 100 | 7 | 100 | Yes |
| 3C | 30% | 7.5% | 13.58 | 7 | 7 | 100 | 3 | 50 | Yes |
| 5B | 0% | 30% | 21.9 | 2 | N/A | 0 | N/A | 0 | N/A |

As can be seen from Table above, the additional 7.5% HEMA in latex core of coating "3C" compared to "3B" resulted in worse resistance to acetic acid. When HEMA is totally removed from latex soap, as shown in coating "5B", a total delamination occurred in both 1% Joy and 3% acetic acid tests.

Example 7

Latex with 15% Glycidyl Methacrylate (GMA)

Acrylic latex "4C" using acrylic soap "4A" was made as follows:

| Ingredients | | Parts by Weight |
|---|---|---|
| Acrylic soap "4A" | Charge #1 | 270.00 |
| DI Water | | 684.16 |
| Hydrogen Peroxide 35% in water | Charge #2 | 2.11 |
| DI Water | | 12.66 |
| Glycidyl Methacrylate | Charge #3 | 32.27 |
| Ethyl Acrylate | | 86.06 |
| Methyl Methacrylate | | 96.82 |
| Benzoin | | 2.85 |
| DI Water | Charge #4 | 7.25 |
| Hydrogen Peroxide 35% in water | Charge #5 | 0.74 |
| DI Water | | 4.41 |
| DI Water | Charge #6 | 0.66 |

A three-liter round bottom, four-necked flask equipped with an agitator, a nitrogen inlet tube, a thermometer, and a reflux condenser was charged with Charge #1. The flask was heated gradually to 70° C. At 70° C., Charge #2 was added to the flask at a steady rate over 125 minutes, and 5 minutes later Charge #3 was fed in over 2 hours. When both charges were completed, Charge #4 was added as monomer rinse and the batch was held at 70° C. for 10 minutes. Then 50% of Charge #5 was added into the flask over 20 minutes to convert the residual monomers, followed by a 30 minutes hold. After the hold, the rest 50% of Charge #5 was added over 20 minutes, followed by 1 hour hold. Then the batch was heated to 90° C. and held for 1 hour to complete the reaction. The latex was cooled down and filtered with 1 μm filter bag. This batch yielded a latex with 25% NV, and a particle size of 77 nm.

Test Results for the Effect of GMA

Two coatings were prepared by drawing down latex samples "4B" and "4C" over beverage aluminum can body substrate at a film weight of 3 msi (milligram per square inch). The coatings were baked for 3 minutes at 380° F. as-is without external crosslinker. The coatings were evaluated for MEK double rubs, Joy pasteurization and acetic acid resistance.

| Example | Wt % GMA On latex core | Wt % GMA On latex solids | MEK double rubs | 1% Joy Blush | 1% Joy Adhesion | 3% Acetic Acid Blush | 3% Acetic Acid Adhesion | 3% Acetic Acid Microblisters |
|---|---|---|---|---|---|---|---|---|
| 4B | 7.5% | 5.48% | 9 | 7 | 100 | 7 | 100 | No |
| 4C | 15% | 10.95% | 18 | 8 | 100 | 7 | 100 | No |

As shown in the Table above, the increase of GMA level from 7.5% to 15% in latex significantly improved cure response as reflected by the increase of MEK double rubs.

Example 8

Latex with Higher Glass Transition Temperature (Tg) in Latex Core

Acrylic latex "4D" using acrylic soap "4A" was made as follows:

| Ingredients | | Parts by Weight |
|---|---|---|
| Acrylic soap "4A" | Charge #1 | 270.00 |
| DI Water | | 684.16 |
| Hydrogen Peroxide 35% in water | Charge #2 | 2.11 |
| DI Water | | 12.66 |
| Glycidyl Methacrylate | Charge #3 | 16.14 |
| Ethyl Acrylate | | 43.03 |
| Methyl Methacrylate | | 155.99 |
| Benzoin | | 2.85 |
| DI Water | Charge #4 | 7.25 |
| Hydrogen Peroxide 35% in water | Charge #5 | 0.74 |
| DI Water | | 4.41 |
| DI Water | Charge #6 | 0.66 |

A three-liter round bottom, four-necked flask equipped with an agitator, a nitrogen inlet tube, a thermometer, and a reflux condenser was charged with Charge #1. The flask was heated gradually to 70° C. At 70° C., Charge #2 was added to the flask at a steady rate over 125 minutes, and 5 minutes later Charge #3 was fed in over 2 hours. When both charges were completed, Charge #4 was added as monomer rinse and the batch was held at 70° C. for 10 minutes. Then 50% of Charge #5 was added into the flask over 20 minutes to convert the residual monomers, followed by a 30 minutes hold. After the hold, the rest 50% of Charge #5 was added over 20 minutes, followed by 1 hour hold. Then the batch was heated to 90° C. and held for 1 hour to complete the reaction. The latex was cooled down and filtered with 1 μm filter bag. This batch yielded a latex with 25% NV, and a particle size of 79 nm.

Test Results for the Effect of Tg

Two coatings were prepared by drawing down latex samples "4B" and "4D" over beverage aluminum can body substrate at a film weight of 3 msi (milligram per square inch). The coatings were baked for 3 minutes at 380° F. as-is without external crosslinker. The coatings were evaluated for MEK double rubs, Joy pasteurization and acetic acid resistance.

| Example | Soap | Tg (° C.) Core | Tg (° C.) Latex | MEK Double Rubs | 1% Joy Blush | 1% Joy Adhesion | 3% Acetic Acid Blush | 3% Acetic Acid Adhesion | 3% Acetic Acid Microblisters |
|---|---|---|---|---|---|---|---|---|---|
| 4B | 64 | 34 | 42 | 9 | 7 | 100 | 7 | 100 | No |
| 4D | 64 | 66 | 65 | 17 | 7 | 100 | 7 | 100 | No |

As shown in the Table above, the increase of Tg of the latex core from 34° C. to 66° C. and the latex polymer from 42° to 65° C. resulted in the increase of MEK double rubs significantly from 9 to 17.

Examples 9-10

Self-Curing Coating Composition Containing (Meth)Acrylic Graft Copolymer

It was found that coating compositions based on grafted (meth)acrylic copolymers containing hydroxyl and carboxylic acid functional groups is able to self-cure under high temperature, long bake time condition (such as bottle can (metal can shaped like a bottle with an elongated neck) bake condition, 475F 3 minutes). Two SEMA-containing grafted acrylic (1% by weight SEMA based on weight of (meth)acrylic monomers) were tested to look at the impact of hydroxyethyl acrylate (HEA) content on curing and flexibility.

Example 9: 15% HEA

| Ingredients | | Parts by Weight |
|---|---|---|
| 2-butoxyethanol | Charge #1 | 116.88 |
| Isopropanol | | 72.16 |
| Methyl Methacrylate | Charge #2 | 208.28 |
| n-Butyl Acrylate | | 67.55 |
| Hydroxyethyl Acrylate | | 93.82 |
| Allyl Methacrylate | | 5.63 |
| tert-Butyl Peroctoate | | 13.60 |
| Isopropanol | | 40.91 |
| Dimethylethanolamine | Charge #3 | 2.04 |
| Acrylic Acid | Charge #4 | 91.68 |
| Ethyl Methacrylate | | 50.93 |
| n-Butyl Acrylate | | 59.08 |
| Sulfoethyl Methacrylate | | 2.04 |
| tert-Butyl Peroctoate | | 7.39 |
| 2-butoxyethanol | | 9.30 |
| Isopropanol | | 39.61 |
| Dimethylethanolamine | Charge #5 | 32.27 |
| DI Water | Charge #6 | 1086.83 |

A five-liter round bottom, four-necked flask equipped with an agitator, a nitrogen inlet tube, a thermometer, and a reflux condenser was charged Charge #1. The flask was heated gradually to reflux at around 98° C. Reflux was maintained during the polymerization. In a separate vessel, a mixture of Charge #2 was prepared. At 98° C. reflux condition, the Charge #2 was added to the flask at a steady rate over 2.5 hours. When completed, the batch was held under reflux at about 98° C. for 30 minutes, and then the reflux was broken for Charge #3 addition. The Charge #3 was added into the flask and then reflux was re-established in 10 minutes. In a separate vessel, a mixture of Charge #4 was prepared. Then Charge #4 was added to the flask at a steady rate over 2 hours, while reflux was maintained at around 98° C. When completed, the batch was then held for 1 hour under reflux. After the reaction was completed, the batch was then cooled down to <100° C., when Charge #5 was added over 5 minutes followed by Charge #6. This batch yielded a polymer dispersion with 29.32% NV. The polymer had a number average molecular weight of 5,300 and a Tg of 30° C.

Example 10: 5% HEA

| Ingredients | | Parts by Weight |
|---|---|---|
| 2-butoxyethanol | Charge #1 | 116.88 |
| Isopropanol | | 72.16 |
| Methyl Methacrylate | Charge #2 | 230.80 |
| n-Butyl Acrylate | | 108.83 |
| Hydroxyethyl Acrylate | | 30.02 |
| Allyl Methacrylate | | 5.63 |
| tert-Butyl Peroctoate | | 13.60 |
| Isopropanol | | 40.91 |
| Dimethylethanolamine | Charge #3 | 2.04 |
| Acrylic Acid | Charge #4 | 91.68 |
| Methyl Methacrylate | | 42.78 |
| n-Butyl Acrylate | | 67.23 |
| Sulfoethyl Methacrylate | | 2.04 |
| tert-Butyl Peroctoate | | 7.39 |
| 2-butoxyethanol | | 9.30 |
| Isopropanol | | 39.61 |
| Dimethylethanolamine | Charge #5 | 32.27 |
| DI Water | Charge #6 | 1086.83 |

A five-liter round bottom, four-necked flask equipped with an agitator, a nitrogen inlet tube, a thermometer, and a reflux condenser was charged Charge #1. The flask was heated gradually to reflux at around 98° C. Reflux was maintained during the polymerization. In a separate vessel, a mixture of Charge #2 was prepared. At 98° C. reflux condition, the Charge #2 was added to the flask at a steady rate over 2.5 hours. When completed, the batch was held under reflux at about 98° C. for 30 minutes, and then the reflux was broken for Charge #3 addition. The Charge #3 was added into the flask and then reflux was re-established in 10 minutes. In a separate vessel, a mixture of Charge #4 was prepared. Then Charge #4 was added to the flask at a steady rate over 2 hours, while reflux was maintained at around 98° C. When completed, the batch was then held for 1 hour under reflux. After the reaction was completed, the batch was then cooled down to <100° C., when Charge #5 was added over 5 minutes followed by Charge #6. This batch yielded a polymer dispersion with 27.15% NV, and a number average molecular weight of 6,600.

Coating Test Results

Two coating formulation were prepared as shown below. Coatings were drawn down over bottle can aluminum can body substrate at a target film weight of 3 msi (milligram per square inch). The coatings were baked for 30 seconds at 475° F. and then 3 minutes at 475° F., which is a typical bottle can bake condition. The coated panels were evaluated for MEK double rubs and retort performance (250° F., 30 minutes). Flexibility (retention of adhesion) were evaluated by Erichsen cup fabrication.

| Coating Code | Formulation | Weight (g) | Wt % HEA based on total monomer weight |
|---|---|---|---|
| Coating A | Example 1 | 50 | 15.64% |
| | Byk 333 (Silicone surface additive from BYK Additives) | 0.17 | |
| | Michem Lube 160 F. (Wax emulsion from Nuchem Inc.) | 0.417 | |

| Coating Code | Formulation | Weight (g) | Wt % HEA based on total monomer weight |
|---|---|---|---|
| | Microspersion 523 (Aqueous dispersion of polyethylene and PTFE waxes from Micro Powders Inc.) | 0.33 | |
| Coating B | Example 2 | 50 | 5.00% |
| | Byk 333 | 0.17 | |
| | Michem Lube 160 F. | 0.417 | |
| | Microspersion 523 | 0.33 | |

| Coating Code | MEK double rubs | Flat Panel Retort (250° F., 30 min) Blush | Flat Panel Retort (250° F., 30 min) Adhesion | Erichsen Cup Adhesion |
|---|---|---|---|---|
| Coating A | 20 | 8 | 100 | 100 |
| Coating B | 4 | 8 | 100 | 100 |

Retort Test: The retort test is designed to measure the resistance of a coating to deionized water. Coated strips are immersed into the deionized water and placed in a steam retort for 30 minutes at 250° F. (121° C.). The strips are then cooled in deionized water, dried, and immediately rated for blush and adhesion as described previously.

Erichsen Cup Test: In this test the coated metal was formed into a 1 inch diameter, 1.25 inch high cylindrical drawn cup by a 2-stage drawing process using an Erichsen model 224. In a steel beaker, the cups were submerged in a pH 9 buffer solution (4 g solution per 100 g DI water) and retorted at 250° F. (121° C.) 16 psi for 60 minutes. The cups were immediately rated for adhesion as described previously.

As shown in the table above, the acrylic is capable of self-cure under the bottle can bake condition. The more hydroxyl-containing monomer (HEA), the higher MEK double rubs, indicating higher crosslink density.

Example 11

Solution SEMA Acrylic (3045-45)

A waterborne SEMA-containing solution acrylic was evaluated for washcoat application for 2-piece food cans. It was found the SEMA acrylic can self-cure under washcoat bake condition (2.5 minutes 400F and 5 minutes 400F) and exhibit desired performance properties.

Example 11.1: Synthesis of Solution SEMA Acrylic

| Ingredients | | Parts by Weight |
|---|---|---|
| n-Butanol | Charge #1 | 225.08 |
| Butyl Cellosolve | | 225.08 |
| Dimethylethanolamine | | 10.51 |
| Hydroxyethyl Acrylate | Charge #2 | 315.18 |
| n-Butyl Acrylate | | 105.06 |
| Acrylic Acid | | 157.59 |
| Methyl Methacrylate | | 462.26 |
| Sulfoethyl Methacrylate | | 10.51 |
| tert-Butyl Peroctoate | | 29.42 |
| Dimethylethanolamine | Charge #3 | 39.43 |
| DI Water | Charge #4 | 1119.91 |

A three-liter round bottom, four-necked flask equipped with an agitator, a nitrogen inlet tube, a thermometer, and a reflux condenser was charged Charge #1. The flask was heated gradually to sub-reflux at 100-102° C. In a separate vessel, a mixture of Charge #2 was prepared. At 100-102° C., Charge #2 was added to the flask at a steady rate over 4 hours. When completed, the batch was held for 1 hour to complete the polymerization stage. Then the batch was then cooled down to <100° C. to add Charge #3 and Charge #4. This batch yielded a polymer dispersion with 38.92% NV, a Brookfield viscosity of 3200 centipoise, and a number average molecular weight of 9,200.

Example 11.2: Coating Test Results for Washcoat Application

Coating formulation was prepared by mixing Example 11.1 resin with 3% Microspersion 523 wax and diluted to 30% solids. Coatings were drawn down over tin plate substrate at a target film weight of 1-2 msi (milligram per square inch) and was baked under OBO bake condition (2.5 minutes 400° F.) and then IBO bake condition (5 minutes 400° F.). The coated panels were evaluated for the following tests as shown in tables below.

| OBO (2.5' @ 400° F.) | PPG5200-811 | Example 11.1 |
|---|---|---|
| Altek | 0.055 | 0.072 |
| MEK Rubs | 5 | 15 |
| Sheen Scratch | 200 g | 800 g |
| Bead Adhesion | No loss | Severe loss on bead peaks* |
| Blistering (Leneta Test) | Severe in all channels | Slight microblistering in heavy channels only |

*Loss only occurs on bead peaks taped with 610 tape and does not appear on untaped sample after IBO

| IBO (OBO panel rebaked 5' @ 400° F.) | PPG5200-811 | Example 11.1 |
|---|---|---|
| Altek | 0.064 | 0.060 |
| MEK Rubs | 20 | 125 |
| Sheen Scratch | 300 g | 800 g |
| Bead Adhesion | Very slight peppering | No loss |
| pH 10 Retort | Slight blush - submerged, no adhesion loss | Slight blush - submerged, no adhesion loss |
| pH 10.5 Retort | Slight blush - submerged, no adhesion loss | Slight blush - submerged, no adhesion loss |
| pH 11 Retort | Moderate blush - submerged, slight peppering - submerged and headspace | Complete failure - submerged, no headspace loss |

Additionally, resin Example 11.1 and control PPG5200-811 were diluted to 11.5% solids (customers' application viscosity), poured over unwashcoated cans (excess shaken off), OBO baked, and evaluated for flow. Control and sample had equal flow, exhibiting no de-wetting over the cans. Cans were checked for bead adhesion, and no loss was observed.

Whereas particular embodiments of this invention have been described above for purposes of illustration, it will be evident to those skilled in the art that numerous variations of the details of the present invention may be made without departing from the invention as defined in the appended claim

The invention claimed is:

1. A self-curing coating composition comprising a polymer containing hydroxyl groups, carboxylic acid groups and acid groups comprising sulfonic acid groups and/or phosphoric acid groups.

2. The coating composition of claim 1 wherein the polymer is prepared from a mixture of ethylenically unsaturated monomers comprising (i) a sulfonic acid group-containing ethylenically unsaturated monomer and/or a phosphoric acid group-containing ethylenically unsaturated monomer; (ii) a carboxylic acid group-containing ethylenically unsaturated monomer and (iii) a hydroxyl group-containing ethylenically unsaturated monomer.

3. The coating composition of claim 2 in which (i) is present in an amount of at least 0.3 percent by weight based on weight of the mixture of ethylenically unsaturated monomers.

4. The coating composition of claim 2 in which (ii) is present in an amount of at least five percent by weight based on weight of the mixture of the ethylenically unsaturated monomers.

5. The coating composition of claim 2 in which (iii) is present in an amount of at least five percent by weight based on weight of the mixture of the ethylenically unsaturated monomers.

6. The coating composition of claim 2 in which the molar ratio of carboxylic acid groups to hydroxyl groups is from 0.5 to 1.5:1.

7. The coating composition of claim 1, wherein the coating composition is substantially free of bisphenol A.

8. The coating composition of claim 1, wherein the coating composition is substantially free of formaldehyde.

9. A method of coating a package comprising:
(A) applying the coating composition of claim 1 to the package before and/or after forming the package, and
(B) curing the coating composition.

10. The method of claim 9 wherein applying the coating composition to the package comprises applying the composition to a metal substrate in the form of a planar coil or sheet, curing the emulsion polymerized latex polymer, and forming the substrate into a metal can or portion thereof.

11. The method of claim 10 wherein forming the substrate into a metal can or portion thereof comprises forming the substrate into a can end or a can body.

12. The method of claim 10 wherein the metal substrate comprises steel or aluminum.

13. The method of claim 9 wherein applying the composition to a metal substrate comprises applying the composition to the metal substrate after the metal substrate is formed into a metal can or portion thereof.

14. The method of claim 9 in which after applying the composition to the metal substrate, the composition is cured by heating the coated substrate at a temperature of 350 to 500° F. for 0.5 to 10 minutes.

15. A package comprising:
the coating composition of claim 1 deposited on the package.

16. The package of claim 15 wherein the coating composition is substantially free of bisphenol A.

17. The package of claim 15 wherein the coating composition is substantially free of formaldehyde.

18. The package of claim 15 wherein the coating composition is substantially free of styrene.

19. The package of claim 15, wherein the package is a metal can or a portion thereof.

20. The package of claim 15, wherein the metal can or a portion thereof is a can end and/or a can body.

* * * * *